United States Patent Office 2,701,769
Patented Feb. 8, 1955

2,701,769

STABILIZED MONOESTER COMPOSITIONS AND METHOD OF MAKING THE SAME

Noel H. Kuhrt, Rochester, N. Y., assignor to Eastman Kodak Company, Rochester, N. Y., a corporation of New Jersey No Drawing. Application May 17, 1954,
Serial No. 430,427

20 Claims. (Cl. 99—163)

This invention relates to the stabilization of fatty acid monoester compositions and is particularly concerned with stabilized monoglyceride compositions and methods of making such compositions.

Fatty acid monoesters are prepared by esterifying fatty acid with an excess of a polyhydric alcohol or by effecting ester-interchange between a fatty material, such as a fat or fatty oil, and a polyhydric alcohol. Perhaps the best known and most widely used monoester compositions are the monoglycerides which are sold commercially in compositions ranging from more than 90% monoglycerides down to about 35% monoglycerides in admixture with diglycerides and triglycerides. Such monoesters find wide application, particularly in the food and cosmetic fields as well as for various industrial uses.

Monoesters are inherently unstable and readily absorb and react with oxygen to form peroxides. Excessive peroxide formation in the monoester compositions greatly reduces the effectiveness of the monoesters. Many of the conventional antioxidants or stabilizers such as butylated hydroxy anisole and similar phenolic stabilizers which find use in stabilizing fats and oils against rancidity are of little or no use in stabilizing monoesters against peroxide formation. Not only must a stabilizer for monoesters have the ability to stabilize the monoesters against peroxide formation but the stabilizer must be non-toxic and must not adversely affect the physical and chemical properties of the monoesters.

It is accordingly an object of this invention to provide monoester compositions of greatly improved stability against objectionable peroxide formation.

Another object of the invention is to provide new methods of stabilizing fatty acid monoesters of polyhydric alcohols against undesirable development of peroxides during storage.

Another object of the invention is to provide monoester compositions characterized by improved stability at ordinary temperatures and even as high as 120° C.

A further object of the invention is to provide monoester compositions not subject to objectionable loss in effectiveness under normal storage conditions.

A still further object of the invention is to stabilize normally unstable monoglycerides by associating therewith new and improved stabilizing material for such monoglycerides.

Another object of the invention is to provide a simple but highly effective method of stabilizing monoglycerides with non-toxic stabilizers which do not adversely affect the physical and chemical properties of the monoglycerides.

Another object of the invention is to facilitate the use of monoesters in commercial practice by extending the shelf stability of inherently unstable monoester compositions.

Another object of the invention is to provide new compositions of matter having improved utility and consisting predominantly of monoglycerides stabilized with a new and highly effective combination of stabilizing materials under particular conditions effective to impart improved resistance to peroxide formation.

Another object of the invention is to provide compositions consisting predominantly of monoglycerides obtained by ester-interchange between a vegetable oil, such as cottonseed oil, and glycerine but exhibiting much greater resistance to peroxide formation than conventional vegetable oil monoglyceride compositions.

Other objects will be apparent from the description and claims which follow.

These and other objects of the invention are successfully attained by means of this invention which comprises stabilizing monoester compositions such as monoglycerides or the like with a combination of glycine and phosphoric acid at a temperature below 95° C. and thereby forming stable compositions comprising a monoester in admixture with a minor amount of glycine and phosphoric acid.

Any of the well-known fatty acid monoesters of polyhydric alcohols can be stabilized in accordance with this invention. Monoester compositions are readily prepared by reacting a fat, fatty oil or fatty acid with a suitable polyhydric alcohol in the presence of an ester-interchange or alcoholysis catalyst usually at a temperature in excess of about 60–70° C. and desirably at a temperature of about 180–250° C. For food use, the monoesters are usually a glyceryl monoester prepared by effecting ester-interchange between a fatty acid or fatty acid derivative and glycerine, although such other edible polyhydric alcohols as sorbitol, mannitol, pentaerythritol and the like can be used if desired for making other edible monoesters, and other monoesters can be formed from any of the other well-known polyhydric alcohols such as the alkylene glycols as typified by ethylene glycol, propylene glycol or the like, or other similar polyhydric alcohol.

The monoesters employed in practising this invention can be either solid or liquid monoester compositions, and include monoesters admixed with greater or lesser amounts of diesters. Suitable monoesters include animal fat monoesters prepared by ester-interchange between a polyhydric alcohol and any of the well-known animal fats such as lard and tallow, whether partially or fully hydrogenated or unhydrogenated; vegetable oil monoesters prepared by ester-interchange between a polyhydric alcohol and a vegetable oil such as cottonseed oil, corn oil, peanut oil, soybean oil, coconut oil or the like, whether unhydrogenated, partially hydrogenated or fully hydrogenated; and monoesters prepared by reacting a fatty acid such as stearic acid, palmitic acid, oleic acid, linoleic acid, linolenic acid or the like with the desired polyhydric alcohol.

As is well known, the natural fats, including both the vegetable oils and the animal fats, consist predominantly of mixed fatty triglycerides of the higher fatty acids. Thus, for example, coconut oil contains triglycerides of such higher fatty acids as caproic, caprylic, capric, lauric, myristic, palmitic, stearic, oleic and linoleic acids; and lard contains triglycerides of such higher fatty acids as myristic, palmitic, stearic, tetradecenoic, hexadecenoic, oleic, octadecadienoic, and $C_{20}$ to $C_{22}$ unsaturated fatty acids (Hilditch—The Industrial Chemistry of the Fats and Waxes—Third Edition (1948) published in London by Bailliere, Tindall and Cox, pages 169–189). The reaction of glycerine with these fatty triglycerides thus forms glyceryl monoesters of these various higher fatty acids.

The monoesters can be saturated or unsaturated monoesters or mixtures thereof, and are desirably monoester compositions prepared from a triglyceride fat or oil or mixtures of triglyceride fats or oils. The invention is of particular utility in the stabilization of partial ester compositions containing a major proportion of monoglycerides including compositions containing as much as 85 to 90 percent, or more monoglycerides in admixture with a small amount of diglycerides and glycerine.

The monoesters are commonly prepared in an ester-interchange reaction catalyzed by a basic catalyst and preferably a bivalent metal catalyst. The catalyst appears to function in the form of a metal soap complex resulting from interaction of the alkali or alkaline earth metal compound with the free fatty acid normally present in the reaction mixture. The reaction product consisting of a mixture of from 30% to 60% or more of monoglycerides in admixture with diglycerides, triglycerides and unreacted polyhydric alcohol can be stabilized directly after inactivation of the catalyst. Desirably, however, unreacted polyhydric alcohol is separated from the reaction product by phase separation or other well-known separation procedure, and preferably the monoglycerides are separated from the reaction product by vacuum distillation or the like to give highly potent monoglyceride compositions containing only small amounts of diglycerides.

The stabilized compositions embodying the invention are obtained by associating glycine and phosphoric acid with the monoester, preferably by admixing the glycine and phosphoric acid with the monoester at a temperature not substantially higher than 90° C. and desirably below 95° C. and the stabilized compositions are thereafter maintained during storage or addition to other materials at temperatures below 120° C. and desirably below 110° C. since the stabilizing action of the glycine and phosphoric acid is largely destroyed by heating to temperatures above 120° C., apparently due to breakdown of the stabilizing materials. Optimum stabilization is obtained by heating the mixture of monoester, glycine and phosphoric acid to a temperature of at least 50° C. and desirably to from 60° C. to 90° C. or by adding the glycine and phosphoric acid to the monoester maintained at such temperature. In either case such temperatures are desirably maintained for at least from a few minutes to one hour for optimum results although they can be maintained for as much as four hours or longer without deleteriously affecting the stabilization. For commercial practice, the glycine and phosphoric acid can thus be added directly to the freshly-produced and still hot ester-interchange reaction product, preferably as soon as such reaction product has been cooled to a temperature below 95° C., or to the separated monoglyceride as such monoglyceride is separated from the reaction product by vacuum distillation and before the monoester has developed objectionable peroxides. It is feasible to add the stabilizing ingredients to the monoester at a temperature somewhat higher than 95° C. and then to cool the mixture below that temperature, the desired association and stabilization of the mixture thus being obtained below 95° C. Similarly, the glycine and phosphoric acid may be added below 50° C. in case the particular monoglyceride is sufficiently fluid at such temperature.

The glycine and phosphoric acid can be added together but are preferably added separately, and they are desirably added in solution in glycerine or other suitable polyhydric alcohol or other suitable solvent. The phosphoric acid is desirably added in the form of the free acid although materials furnishing phosphoric acid in the composition, such as the sodium salt, can be employed and are within the scope of the invention. Other amino acids such as tyrosine and glutamic acid do not give the enhanced stabilization obtained by means of glycine in accordance with this invention, although the glycine can be added in the form of a salt of glycine such as the sodium salt or the crude glycine-containing amino acid composition obtained by hydrolyzing protein such as soybean meal or the like, or similar material furnishing glycine during the stabilization and such glycine-furnishing materials are likewise within the scope of the invention.

The amount of glycine and phosphoric acid employed depends upon the monoester composition being stabilized, the stability desired and the conditions to which the stabilized composition will be subjected. Optimum results are obtained with concentrations of phosphoric acid not greater than twice the concentration of glycine and ratios of glycine to phosphoric acid of from 4:1 to 1:2 are desirably employed although other proportions can be used. The combined weight of glycine and phosphoric acid is desirably from about 0.005% to about 0.1% of the weight of monoester for optimum enhancement although larger amounts up to at least 1% or even 5% can be employed if desired and amounts below 0.0005% can be employed particularly with saturated monoester compositions.

The stabilization obtained in accordance with this invention is illustrated by the results set out in Table 1. The monoester employed in the compositions was a cottonseed oil monoglyceride composition prepared by effecting ester-interchange between cottonseed oil and an excess of glycerine according to known procedures and vacuum distilling the monoester from the reaction product to give a cottonseed oil monoglyceride composition consisting of more than 90% of mixed monoglycerides.

The stability of the compositions was evaluated by the Active Oxygen Method (AOM), also known as the Swift Stability Test, wherein the composition is heated at 96° C. with air bubbling through it and the peroxide content in millimols per kilogram of composition is determined at periodic intervals. A peroxide value (P. V.) of 20 is considered the maximum permissible peroxide content for commercially useable monoester compositions.

Table 1

| Composition | Hrs. to P. V. 20 (AOM) |
| --- | --- |
| 1. Monoglyceride (control) | 2 |
| 2. Monoglyceride+0.02% glycine | 8 |
| 3. Monoglyceride+0.02% phosphoric acid | 8 |
| 4. Monoglyceride+0.02% glycine+0.02% phosphoric acid | 82 |
| 5. Monoglyceride+0.02% glycine+0.02% phosphoric acid +0.02% citric acid | 32 |
| 6. Monoglyceride+0.02% glycine+0.01% phosphoric acid | 57 |
| 7. Monoglyceride+0.02% glycine+0.005% phosphoric acid | 48 |
| 8. Monoglyceride+0.015% glycine+0.02% phosphoric acid | 70 |
| 9. Monoglyceride+0.02% glycine (as sodium salt)+0.02% phosphoric acid | 50 |
| 10. Monoglyceride+0.02% glycine+0.02% phosphoric acid (as sodium salt) | 55 |

The compositions tested in Table 1 were prepared by adding the stabilizers in a 4% glycerol solution to the cottonseed oil monoglycerides at a temperature of about 90° C. As can be seen, neither glycine nor phosphoric acid alone imparts much added stability to the monoglycerides whereas the combination of glycine and phosphoric acid gives a composition having 82 hours stability under the accelerated test conditions which is equivalent to many months of normal shelf storage. Good stability results from the addition of the glycine in the form of the sodium salt or the phosphoric acid as the sodium salt. The addition of citric acid to the glycine and phosphoric acid actually decreases the stability from 82 hours to 32 hours even though citric acid was usually considered to be a good stabilizer for monoesters prior to this invention.

The effect of elevated temperatures on the stability of monoesters stabilized in accordance with this invention is shown in Table 2. A cottonseed oil monoglyceride composition was stabilized with 0.02% glycine and 0.02% phosphoric acid at 60° C., the resulting stabilized composition heated at various temperatures and the stability again determined. At temperatures up to 96° C., the composition exhibited a stability of 55 hours to reach a peroxide value of 20. Portions of the composition were then heated at various temperatures above 96° C. for 30 minutes and 60 minutes and the stability after such heating is set out in Table 2 as determined by the accelerated Active Oxygen Method.

Table 2

| Temp., ° C. | Time of Heating | Subsequent Stability Hrs. to P. V. 20 (AOM) |
| --- | --- | --- |
| 60 | 1 hour | 55 |
| 100 | 30 minutes | 33 |
| 110 | do | 30 |
| 115 | do | 30 |
| 120 | do | 30 |
| 130 | do | 12 |
| 100 | 60 minutes | 29 |
| 110 | do | 29 |
| 115 | do | 24 |
| 120 | do | 16 |
| 130 | do | 8 |

Thus the stabilized compositions embodying the invention are desirably maintained at temperatures below 120° C. and preferably below 100° C. following stabilization. Similarly, the stabilization itself should be effected at a temperature not substantially higher than 90° C. since if the addition of glycine and phosphoric acid to the monoester is effected at 96° C. and the composition immediately subjected to the accelerated test at 96° C., its stability is only about eight hours.

The invention is equally applicable for stabilizing monoesters of hydrogenated fats and oils and for monoesters mixed with diesters. Thus, partially hydrogenated cottonseed oil was reacted with glycerine to give a mixture containing about 40% monoglycerides and 30% diglycerides. The mixture was then tested without further stabilization, with citric acid stabilization, and with glycine and phosphoric acid stabilization in accordance with this invention. The results are shown in Table 3.

Table 3

| Additive | Hrs. to P. V. 20 (AOM Method) |
|---|---|
| Control | 9 |
| 0.02% citric acid | 11 |
| 0.02% glycine+0.02% phosphoric acid | 48 |

A peanut oil monoglyceride composition prepared in a similar manner showed similarly improved results as shown in Table 4.

Table 4

| Additive | Hrs. to P. V. 20 (AOM Method) |
|---|---|
| Control | 1.5 |
| 0.02% glycine+0.02% phosphoric acid | 38 |

Animal fat monoester compositions are also stabilized by glycine and phosphoric acid. Thus, a sample of lard was reacted with glycerine and the lard monoglycerides formed thereby were vacuum distilled from the resulting reaction product. A solution containing 4% glycine and 4% phosphoric acid in glycerol was added to the separated lard monoglycerides at a temperature of about 70° C. The stability results by the accelerated AOM test are set out in Table 5.

Table 5

| Composition | Hours to P. V. 20 |
|---|---|
| Lard monoglycerides | 2 |
| Lard monoglycerides+0.02% glycine+0.02% phosphoric acid | 115 |

Similarly improved results are obtained with other monoester compositions prepared from other fats and oils and fatty acids. The invention thus provides an improved method of stabilizing normally unstable monoesters against objectionable peroxide formation which would otherwise deleteriously affect the activity of the monoesters.

This application is a continuation-in-part of my co-pending applications Serial Nos. 253,468 and 253,470, both filed October 26, 1951.

A particularly advantageous use of the present stabilized monoester compositions in shortenings and similar fatty compositions is disclosed and claimed in the above-mentioned co-pending application Serial No. 253,470 and in a continuation-in-part thereof filed concurrently herewith.

Although the invention has been described in considerable detail with reference to certain preferred embodiments thereof, it will be understood that variations and modifications can be effected within the spirit and scope of the invention as described hereinabove and as defined in the appended claims.

I claim:

1. The method of stabilizing a monoglyceride composition obtained by reacting a higher fatty acid triglyceride with glycerine in the presence of an ester-interchange catalyst which comprises admixing glycine and phosphoric acid with said monoglyceride composition, and maintaining the resulting mixture for a substantial time within the temperature range 50° to 90° C.

2. The method of stabilizing a fat-forming fatty acid monoglyceride which comprises dispersing glycine and phosphoric acid, in glycerol solution, in a higher fatty acid monoglyceride and maintaining the resulting mixture for a substantial time within the temperature range 50° to 90° C.

3. The method which comprises preparing a monoglyceride composition by reacting a higher fatty acid triglyceride with glycerine at a temperature above 70° C. and in the presence of an ester-interchange catalyst, and dispersing in the resulting monoglyceride composition glycine and phosphoric acid while said composition is at a temperature of at least 50° C. and not substantially higher than 90° C.

4. The method which comprises preparing a monoglyceride composition by reacting a fatty triglyceride of higher fatty acids with glycerine in the presence of an ester-interchange catalyst at a temperature above 70° C., separating monoglyceride from the resulting reaction product, and stabilizing said separated monoglyceride by admixing glycine and phosphoric acid with said separated monoglyceride while said separated monoglyceride is at an elevated temperature not substantially higher than 90° C.

5. A composition of matter obtained at a temperature below 95° C. and characterized by stability against oxidative rancidity, said composition comprising a vegetable oil monoglyceride, glycine and phosphoric acid, said monoglyceride amounting to at least 30% of the weight of said composition.

6. A composition of matter obtained at a temperature below 95° C. and characterized by stability against oxidative rancidity, said composition comprising an animal fat monoglyceride, glycine and phosphoric acid, said monoglyceride amounting to at least 30% of the weight of said composition.

7. A composition consisting predominantly of vegetable oil monoglycerides prepared by ester-interchange between a vegetable oil and glycerine and containing glycine and phosphoric acid effective to stabilize said monoglycerides against oxidative rancidity, said composition having been obtained below 95° C. and maintained at a temperature not higher than 120° C.

8. A composition consisting predominantly of animal fat monoglycerides prepared by ester-interchange between an animal fat and glycerine and containing glycine and phosphoric acid effective to stabilize said monoglycerides, said composition having been obtained at a temperature below 95° C. and maintained at a temperature not higher than 120° C.

9. A composition consisting predominantly of cottonseed oil monoglycerides and containing glycine and phosphoric acid effective to stabilize said monoglycerides, said composition having been obtained at a temperature below 95° C. and thereafter maintained at a temperature not higher than 120° C.

10. A composition consisting predominantly of lard monoglycerides and containing glycine and phosphoric acid effective to stabilize said monoglycerides against oxidative rancidity, said composition having been obtained at a temperature below 95° C. and thereafter maintained at a temperature not higher than 120° C.

11. A composition consisting of at least 85% by weight of cottonseed oil monoglycerides and containing glycine and phosphoric acid in substantially equal amounts effective to stabilize said monoglycerides, said composition having been obtained at a temperature of 50° to 90° C. and thereafter maintained at a temperature below 120° C.

12. A composition of matter characterized by stability against oxidative rancidity, said composition comprising at least 30% by weight of a higher fatty acid monoester of a polyhydric alcohol stabilized with glycine and phosphoric acid at a temperature below 95° C.

13. The method of stabilzing a higher fatty acid monoester of a polyhydric alcohol which comprises admixing said monoester with glycine and phosphoric acid and maintaining the resulting mixture for a substantial time at a temperature below 95° C.

14. The method of stabilizing a higher fatty acid monoester of glycerine which comprises associating said monoester with glycine and phosphoric acid at a temperature not substantially higher than 90° C.

15. The method of stabilizing a higher fatty acid monoglyceride composition prepared by reacting glycerine with a member of the group consisting of vegetable oils, animal fats and free higher fatty acids which comprises dispersing glycine and phosphoric acid, in glycerol solution, in said monoglyceride composition and maintaining the resulting mixture for a substantial time at a temperature below 95° C.

16. A composition of matter obtained at a temperature below 95° C. and comprising a higher fatty acid glyceryl monoester, glycine and phosphoric acid, said monoester amounting to at least 30% of the weight of said composition.

17. A composition consisting predominantly of monoglycerides prepared by reacting glycerine with a member of the group consisting of vegetable oils, animal fats and higher free fatty acids, and containing glycine and phosphoric acid effective to stabilize said monoglycerides against oxidative rancidity, said composition having been formed at a temperature below 95° C. and maintained at a temperature not higher than 120° C.

18. Higher fatty acid monoester of a polyhydric alcohol stabilized with glycine and phosphoric acid.

19. Higher fatty acid monoglyceride stabilized with glycine and phosphoric acid.

20. A composition of matter characterized by stability against oxidation and comprising in admixture glycine, phosphoric acid, and a higher fatty acid monoglyceride product of reacting glycerine with a member of the group consisting of vegetable oils, animal fats and free higher fatty acids, said monoglyceride product amounting to at least 30% of the weight of said composition.

No references cited.